(12) United States Patent
Little (10) Patent No.: US 8,990,243 B2
(45) Date of Patent: Mar. 24, 2015

(54) DETERMINING DATA LOCATION IN A DISTRIBUTED DATA STORE

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 121 days.

(21) Appl. No.: 13/304,203

(22) Filed: Nov. 23, 2011

(65) Prior Publication Data

US 2013/0132408 A1    May 23, 2013

(51) Int. Cl.
 *G06F 17/30* (2006.01)
(52) U.S. Cl.
 CPC .................................. *G06F 17/3033* (2013.01)
 USPC ......................................... 707/769; 707/802
(58) Field of Classification Search
 None
 See application file for complete search history.

(56) References Cited

U.S. PATENT DOCUMENTS

| | | | |
|---|---|---|---|
| 6,134,551 A * | 10/2000 | Aucsmith | 1/1 |
| 2003/0005036 A1* | 1/2003 | Mitzenmacher | 709/203 |
| 2004/0111486 A1* | 6/2004 | Schuh et al. | 709/214 |
| 2005/0108368 A1* | 5/2005 | Mohan et al. | 709/220 |
| 2008/0195954 A1* | 8/2008 | Dharmarajan et al. | 715/749 |
| 2008/0212111 A1* | 9/2008 | Masuda | 358/1.9 |
| 2010/0312749 A1* | 12/2010 | Brahmadesam et al. | 707/609 |
| 2011/0072206 A1* | 3/2011 | Ross et al. | 711/108 |
| 2011/0099187 A1 | 4/2011 | Hansen | |

* cited by examiner

*Primary Examiner* — Son T Hoang
(74) *Attorney, Agent, or Firm* — Lowenstein Sandler LLP (57) ABSTRACT

A computing device identifies a location of a data item in a distributed data store. The computing device generates at least one probabilistic data structure that contains information to identify a probable location of the data item. The computing device transmits the at least one probabilistic data structure to one or more client computing devices, wherein the at least one probabilistic data structure is usable by the one or more client computing devices to determine the probable location of the data item.

18 Claims, 6 Drawing Sheets

DETERMINING DATA LOCATION IN A DISTRIBUTED DATA STORE

TECHNICAL FIELD

Embodiments of the present invention relate to distributed data stores, and more specifically to using bloom filters to determine locations of data in distributed databases.

BACKGROUND

Cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing providers may offer infrastructure as a service (IaaS), platform as a service (PaaS), storage as a service (SaaS), data as a service (DaaS), etc. Each of these services typically has the properties of elasticity (ability to deal with new nodes being added and existing nodes being removed dynamically), high availability, scalability, and linear response times.

One or more of IaaS, PaaS, SaaS and DaaS may be used to implement a distributed data store such as a distributed database. In a distributed data store, data may be distributed across multiple different data stores. Such data may periodically be moved to balance load, reduce costs, and/or for other reasons. Additionally, new data stores may be brought online or existing data stores may be taken offline dynamically. Therefore, clients do not typically know where particular data items reside in the distributed data store. To access data, clients usually need to contact a name server that maintains information that shows which particular data store in the distributed data store each item of data is stored on at any given time. However, since clients typically need to contact the name server, the name server may become a bottleneck that can reduce throughput for the distributed data store.

BRIEF DESCRIPTION OF THE DRAWINGS

The present invention is illustrated by way of example, and not by way of limitation, in the figures of the accompanying drawings and in which.

DETAILED DESCRIPTION

Described herein are a method and apparatus for using bloom filters to locate data items in a distributed data store such as a distributed database. In one embodiment, a server computing device identifies locations of a plurality of data items in a distributed data store. The server computing device generates a bloom filter or multiple bloom filters that contain information to identify probable locations of the plurality of data items. The data items may be database tables, database records, database columns and/or database fields. The server computing device transmits the bloom filter or bloom filters to one or more client computing devices. A client computing device may then receive a query for a particular data item (e.g. from an application running on the client computing device or from a user) and use the bloom filters to determine a probable location in the distributed data store for the particular data item. If the computing device fails to access the particular data item at the determined probable location, then the client computing device may query the server computing device for the location of the particular data item.

Embodiments of the present invention enable client computing devices to access data items in a distributed data store directly, without accessing a name server. This can significantly reduce a number of queries to the name server (and thus a load on the name server). By reducing the load on the name server, embodiments of the present invention remove the name server as a bottleneck in distributed data stores. Thus, the performance of distributed data stores can be improved by embodiments of the present invention.

In the following description, embodiments of the present invention are described with reference to a distributed database. However, it should be recognized that alternative embodiments may be implemented with other types of data stores such as distributed file systems.

Figure 1:
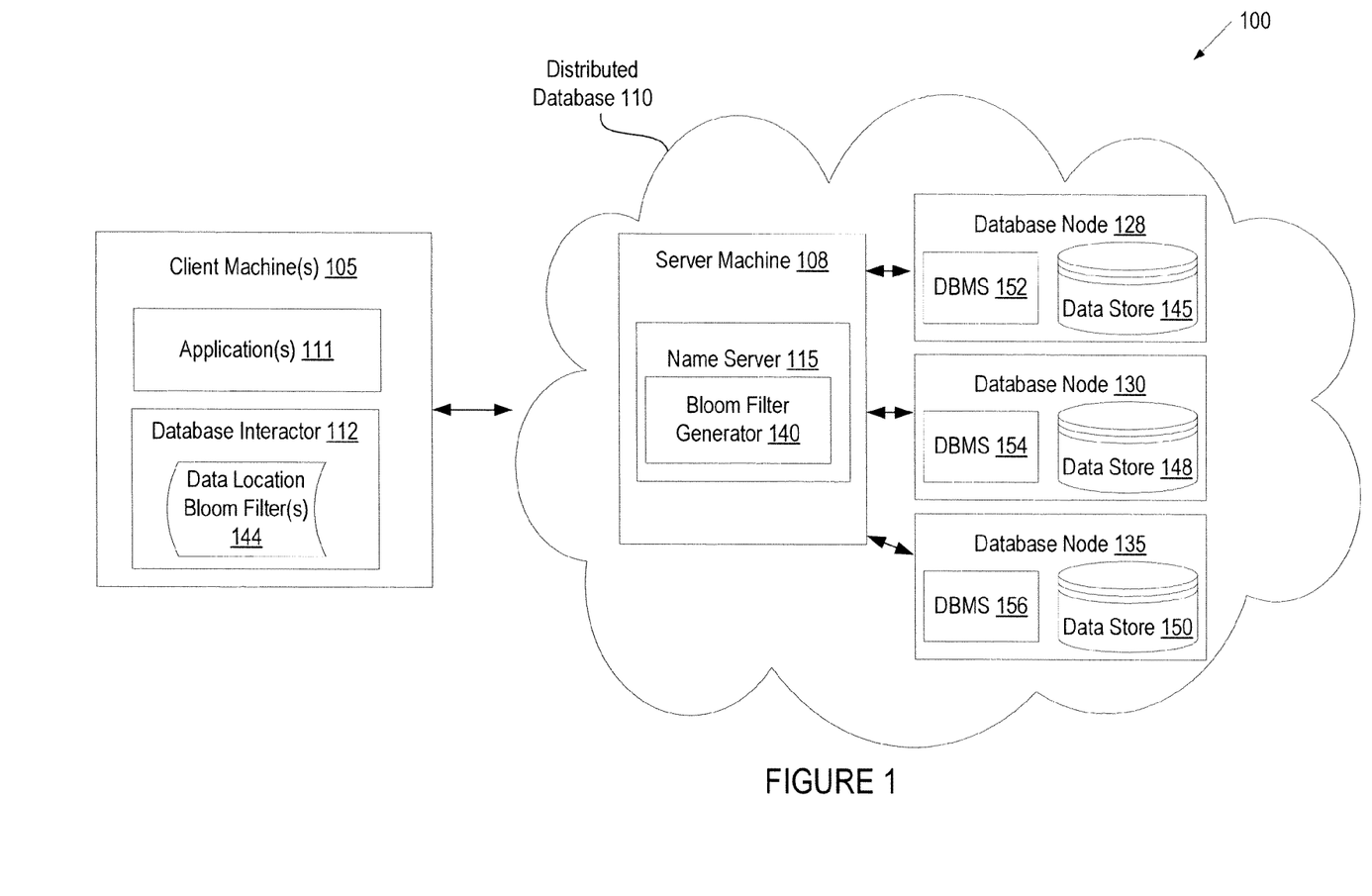
FIG. 1 illustrates an exemplary network architecture, in which embodiments of the present invention may operate.

FIG. 1 illustrates an exemplary network architecture 100, in which embodiments of the present invention may operate. The network architecture 100 includes a client machine 105 connected to a distributed database 110 via a network (not shown). The network may be a public network (e.g., Internet), a private network (e.g., a local area Network (LAN)), or a combination thereof.

The distributed database 110 includes a server machine 108 and one or more database nodes 128, 130, 135 that store data. The distributed database 110 can serve resources (e.g., a stateful or stateless database) to client machines 105. The distributed database 110 distributes stored data across multiple database nodes 128, 130, 135. Not all database nodes typically contain the same data items. For example, database node 128 may contain a first database table, and database node 130 may contain a second database table. However, some database nodes may contain the same data (e.g., may be replications of other database nodes). In one embodiment, the distributed database 110 is elastic (can deal with new nodes being added and nodes being removed), scalable and highly available. The distributed database 110 may also perform load balancing and failover of individual database nodes 128, 130, 135. Therefore, the composition of the distributed database 110 and the distribution of data items between nodes in the distributed database 110 may change over time. Therefore, data can be maintained in the distributed database 110 in a reliable, highly available, linearly scalable and elastic manner.

Machines 105, 108 and database nodes 128, 130, 135 may include hardware machines such as desktop computers, laptop computers, servers, or other computing devices. Each of the machines 105, 108 and/or database nodes 128, 130, 135 may include an operating system that manages an allocation of resources of the computing device (e.g., by allocating memory, prioritizing system requests, controlling input and output devices, managing file systems, facilitating networking, etc.). In one embodiment, one or more of the machines 105, 108 and/or database nodes 128, 130, 135 is a virtual machine. For example, one or more of the machines/nodes may be a virtual machine provided by Amazon® Elastic Compute Cloud (Amazon EC2), a VMWare® virtual machine, etc. In some instances, some machines/nodes may be virtual machines running on the same computing device (e.g., sharing the same underlying hardware resources).

Database nodes 128, 130, 135 are hardware and/or virtual storage units that together form distributed database 110. Each database node 128, 130, 135 includes a data store 145, 148, 150 that is a specific location for data storage. Each data store 145, 148, 150 may include a volatile storage (or a virtualization of volatile storage) and/or non-volatile storage (or a virtualization of non-volatile storage). Each data store 145, 148, 150 contains data items associated with a database. Examples of data items that may be stored in a particular data store 145, 148, 150 include database tables, database records, database columns and database fields. However, in one embodiment database fields are not broken into chunks or split across multiple database nodes. In a further embodiment, database records are not broken up or split across multiple database nodes. By dividing data in the distributed database 110 such that whole database records are located on a node, a number of accesses to the distributed database 110 can be reduced.

In one embodiment, each database node 128, 130, 135 includes an instance of a database management system (DBMS) 152, 154, 156. The DBMS 152, 154, 156 may not have information on the contents of the entire distributed database 110. Rather, each DBMS 152, 154, 156 may contain information on those specific data items contained on a specific data store 145, 148, 150 associated with the DBMS 152, 154, 156. In one embodiment, database nodes 128 include indexes (not shown) on the data items contained within those database nodes.

Each database node 128, 130, 135 may receive and respond to queries for data items included in associated data stores 145, 148, 150. For example, DBMS 152 may serve data stored in data store 145. However, if DBMS 152 receives a query for data stored on data store 148, DBMS 152 may return an error or redirect a client to name server 115. DBMSes 152, 154, 156 may be configured to store data and respond to queries for data using the structured query language (SQL) protocol, NoSQL protocol, or other database protocols.

Distributed database 110 includes a server machine 108 that hosts name server 115. Name server 115 is a central coordinator that typically maintains an up to date view of the contents of database nodes 128, 130, 135. In one embodiment, name server 115 includes an index (not shown) that identifies the location of data items stored by database nodes 128, 130, 135. In one embodiment, name server 115 performs the functions of a centralized DBMS for the distributed database 110. Accordingly, name server 115 may receive and respond to queries for data items in the distributed database 110. Name server 115 may respond to queries for data items by redirecting clients to appropriate database nodes 128, 130, 135.

In one embodiment, name server 108 manages the distribution of data items between database nodes 128, 130, 135. Alternatively, server machine 108 or another server machine (not illustrated) in the distributed database 110 may include management functionality (e.g., a DBMS) for managing the distribution of data items between database nodes. Managing the distribution of data items may include load balancing database nodes, replicating database nodes, instantiating new database nodes, shutting off existing database nodes, migrating data items between database nodes, and so on.

In one embodiment, name server 115 includes a bloom filter generator 140. Bloom filter generator 140 generates data location bloom filters that can be used to determine probable locations of data items in the distributed database 110. For example, a data location bloom filter 144 may be used to determine which database node 128, 130, 135 stores a particular data item. In one embodiment, bloom filter generator 140 generates a separate data location bloom filter for each database node. The data location bloom filter for a particular database node can be used to identify whether a specified data item is stored by that database node.

Client machines 105 include one or more applications (not shown) that may need to store data items to the distributed database 110 and/or retrieve data items from the distributed database 110. Client machines 105 include a database interactor 112 that is responsible for connecting to the distributed database 110, storing data items in the distributed database 110 and retrieving data items from the distributed database 110. Client machine 105 may connect to any of the server machine 108 or database nodes 128, 130, 135 via the network. In one embodiment, client machines 105 make remote procedure calls to the database nodes and/or name server 115 to connect to the distributed database. Alternatively, other communication mechanisms and/or protocols may be used.

Database interactor 112 includes one or multiple data location bloom filters 144, which it receives from name server 115. When database interactor 112 receives a request to retrieve a data item from the distributed database 110, database interactor 112 consults the data location bloom filter (or bloom filters) 144 to determine which database node 128, 130, 135 has the data item. Database interactor 112 may then directly connect to an identified database node (e.g., database node 128) without querying the name server 115. If the requested data item is not stored in the queried database node, then database interactor 112 may query the name server 115. This can significantly reduce a load on the name server 115, and can increase performance of the distributed database 110.

Figure 2A:
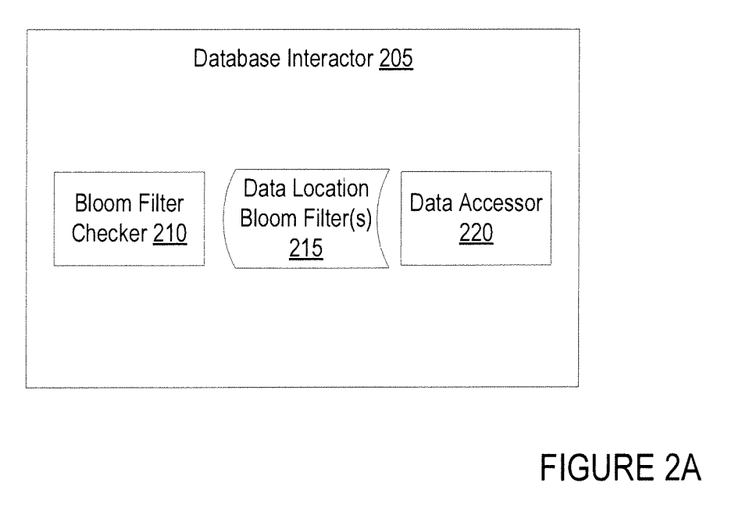
FIG. 2A illustrates a block diagram of a database interactor, in accordance with one embodiment of the present invention.

FIG. 2A illustrates a block diagram of a database interactor 205, in accordance with one embodiment of the present invention. The database interactor 205 may correspond to database interactor 112 of FIG. 1. In one embodiment, the database interactor 205 includes a bloom filter checker 210, a name server queryer 225, a data accessor 220 and one or more data location bloom filters 215. However, the functionality of any of the modules may be divided between multiple modules and/or or the functionality of multiple modules may be combined into a single module.

Database interactor 205 receives the data location bloom filters 215 from a distributed database (e.g., from a name server of a distributed database). Alternatively, database interactor 205 may receive probabilistic data structures other than bloom filters, such as a hash table using cuckoo hashing, bitstate hashing and/or hash compaction.

A bloom filter 215 is a space-efficient randomized data structure for representing a set in order to support membership queries. A bloom filter represents a set $A=\{a_1, a_2, \ldots, a_n\}$ of n elements (called keys). The bloom filter for representing the set A is described by an array of m bits, initially all set to 0. The bloom filter uses k independent hash functions $h_1, \ldots, h_k$ with range $\{1, \ldots, m\}$. For each element $a \in A$, the bits at positions $h_1(a), h_2(a), \ldots, h_k(a)$ in a vector of m bits are set to 1. Given a query for b we check the bits at positions $h_1(b), h_2(b), \ldots, h_k(b)$. If any of them is set to 0, then it is guaranteed that b is not in the set A. Otherwise it can be conjectured that b is in the set.

Depending on the size of the bloom filter and the number of entries, there is a certain chance for a false positive (a determination that b is in the set when it is not). The parameters of k and m should be chosen such that the probability of a false positive is acceptable. In bloom filters there is a tradeoff between m and the probability of a false positive. The probability of a false positive can be approximated to:

$$P=(1-e^{kn/m})^k \quad (1)$$

For example, a bloom filter having 100 bits (m=100), 5 hash functions (k=5) and 10 recorded entries (n=10) has a false positive probability of approximately 0.005. In embodiments of the present invention, bloom filters can be used that have an accuracy of 99.999% at approximately a tenth of the size of a standard hash table.

When database interactor 205 receives a request for a specific data item, database interactor 205 determines whether the specific data item is represented in any data location bloom filters 215. Each data item may have a unique identifier. Based on this unique identifier, the data item can be located within a distributed database. Determining whether the specific data item is represented in a bloom filter 215 may include checking the bloom filter to determine whether appropriate bits corresponding to the unique identifier are set in the bloom filter. Alternatively, an operation may be performed on the unique identifier to generate a value that is used to determine whether the data item is represented in a bloom filter. For example, the unique identifier may be processed by a hash function to generate a hash that can be checked against a data location bloom filter 215.

In one embodiment, database interactor 205 includes a separate bloom filter 215 for each database node of the distributed database. A data item may be checked against each data location bloom filter 215 to determine which (if any) database nodes contain the data item. Bloom filter checker 210 may determine that a data item is not contained in any database nodes if the data item was added to the distributed database after the bloom filters 215 were generated or updated. Bloom filter checker 210 may also determine that the data item is contained in multiple database nodes (e.g., if the distributed database has some degree of redundancy).

Bloom filters 215 may offer significant advantages over standard data structures such as hash tables. Bloom filters 215 are faster to read from, faster to write to, and utilize less storage capacity than standard data structures. However, probabilistic data structures are not 100% accurate. For example, bloom filters have a chance of false positives (as described above).

Data accessor 220 generates requests for data items and sends the requests to database nodes and/or to name servers. Requests may include requests to store data items, to retrieve data items, to search for data items, to retrieve information about data items, and so on. Responses may include data items, information about data items, confirmation messages, error messages, etc. The requests and responses are configured in a specific format (e.g., an SQL format, NoSQL format, etc.) understandable to the distributed database.

As mentioned, data accessor 220 may retrieve data items from the distributed database. Data accessor 220 may store network addresses (e.g., Internet protocol (IP) addresses, domain names, port numbers, etc.) for each database node of the distributed database. Once bloom filter checker 210 identifies a database node (a location) that likely contains the data item, data accessor 220 connects to that database node using the stored network address for that database node. Data accessor 220 may send a database query to the database node. The database query may be formatted according to the SQL protocol, NoSQL protocol, or other database protocol. If the requested data item is stored in the database node, then data accessor 220 receives the data item from the database node and/or information about the data item. Otherwise, data accessor 220 may receive a redirect to a name server. Alternatively, data accessor 220 may receive an error, in which case data accessor 220 queries the name server for the data item. The name server may then locate a database node that contains the data item, and redirect or refer the data accessor 220 to that database node.

In one embodiment, in response to being redirected or referred to a particular database node for a specific data item, database interactor 205 updates a bloom filter associated with that database node. For bloom filters, an existing bloom filter may be modified by adding information for a new member of a set to the existing bloom filter. However, once a member of a set is added to a bloom filter, that member cannot typically later be removed without completely computing the bloom filter (e.g., generating a new bloom filter). Accordingly, in one embodiment, database interactor 205 can add new members (e.g., information for new data items) to bloom filters that have been received from the name server, but database interactor 205 does not remove members from the bloom filters.

Figure 2B:
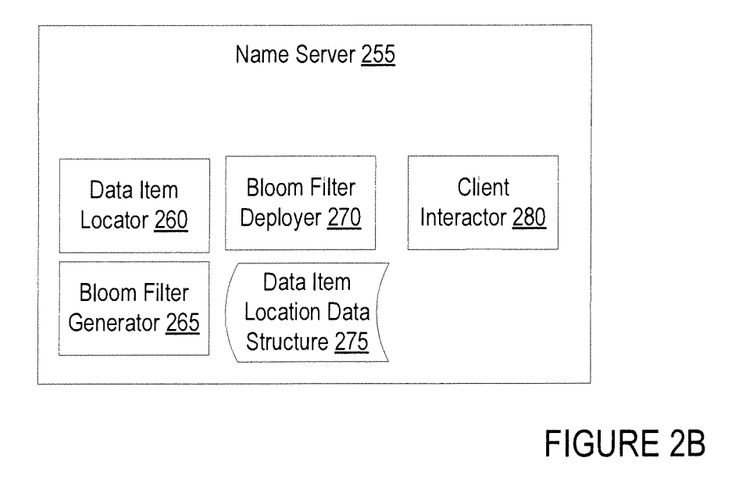
FIG. 2B illustrates a block diagram of a name server, in accordance with one embodiment of the present invention.

FIG. 2B illustrates a block diagram of a name server 255, in accordance with one embodiment of the present invention. The name server 255 may correspond to name server 115 of FIG. 1. The name server 255 is a server that maintains information on data items located throughout a distributed database. Name server 255 may receive notifications whenever data items are added to the distributed database, modified, and or removed from the distributed database. Name server 255 may generate and periodically or continuously update a data item location data structure 275 that identifies locations of data items in the distributed database. For example, name server 255 may update the data structure whenever a notification is received regarding a data item. In one embodiment, the data item location data structure 275 is an index that includes unique identifiers of data items and locations of those data items.

In one embodiment, name server 255 includes a data item locator 260, a bloom filter generator 265, a bloom filter deployer 270, a client interactor 280 and a data item location data structure 275. However, the functionality of any of the modules may be divided between multiple modules and/or or the functionality of multiple modules may be combined into a single module.

Client interactor 280 receives queries from clients and responds to the queries. A received query may be a query for a data item, a query for information about a data item, or some other query type. Once a query for a data item is received, data item locator 260 determines a database node that contains the data item. In one embodiment, data item locator 260 uses a unique identifier for the data item as a key to locate the data item in the data item location data structure 275. Client interactor 280 may then redirect the client to the identified database node, or may notify the client that the data item is stored at the identified database node.

Name server 255 includes a bloom filter generator 265 and a bloom filter deployer 270. Bloom filter generator 270 generates one or more bloom filters that identify which data items are contained in particular database nodes. In one embodiment, bloom filter generator 270 generates a separate data location bloom filter for each database node. A unique identifier for each data item contained in a database node may be added to a bloom filter for that database node. This may include generating multiple hashes of the unique identifiers, and setting bits in the bloom filter based on the hash results.

The data location bloom filters may represent a snapshot of a state of the distributed database at a particular point of time.

In one embodiment, bloom filter generator 265 generates a new data location bloom filter when name server 255 determines that a current data location bloom filter is no longer accurate. This may be determined, for example, when name server 255 receives a query for a data item.

In one embodiment, name server 255 includes a set of bloom filter generation rules that control when to generate new or updated data location bloom filters. The bloom filter generation rules may include a database modification threshold or multiple different modification thresholds. The bloom filter generation rules may also include time based generation rules. For example, new bloom filters may be generated every 5 minutes, every hour, every day, or at some other interval. The modification threshold (or thresholds) may include a specified number of changes to the database, such as additions of new data items, deletions of data items, migration of data items between database nodes, addition of new database nodes, removal of database nodes, etc. For example, a first modification threshold may be 100 additions, deletions or migrations of data items. Accordingly, when more than 100 data items are added, removed and/or moved between database nodes, this may trigger generation of a new data location bloom filter. A second modification threshold may be addition or removal of a database node. When a new database node is generated, a bloom filter for that database node may be generated. Similarly, when an existing database node is taken offline, the bloom filter for that database node may be deleted.

Once bloom filter generator 265 generates the data location bloom filter (or bloom filters), bloom filter deployer 270 distributes the bloom filter(s) to clients. Bloom filter deployer 270 may maintain a list of clients. The list may include clients that have accessed the distributed database over a predetermined time period. Alternatively, the list may include clients that have subscribed to a bloom filter service provided by the distributed database. When new clients connect to name server 255, bloom filter deployer 270 may also transmit the bloom filter (or bloom filters) to those new clients.

Figure 3:
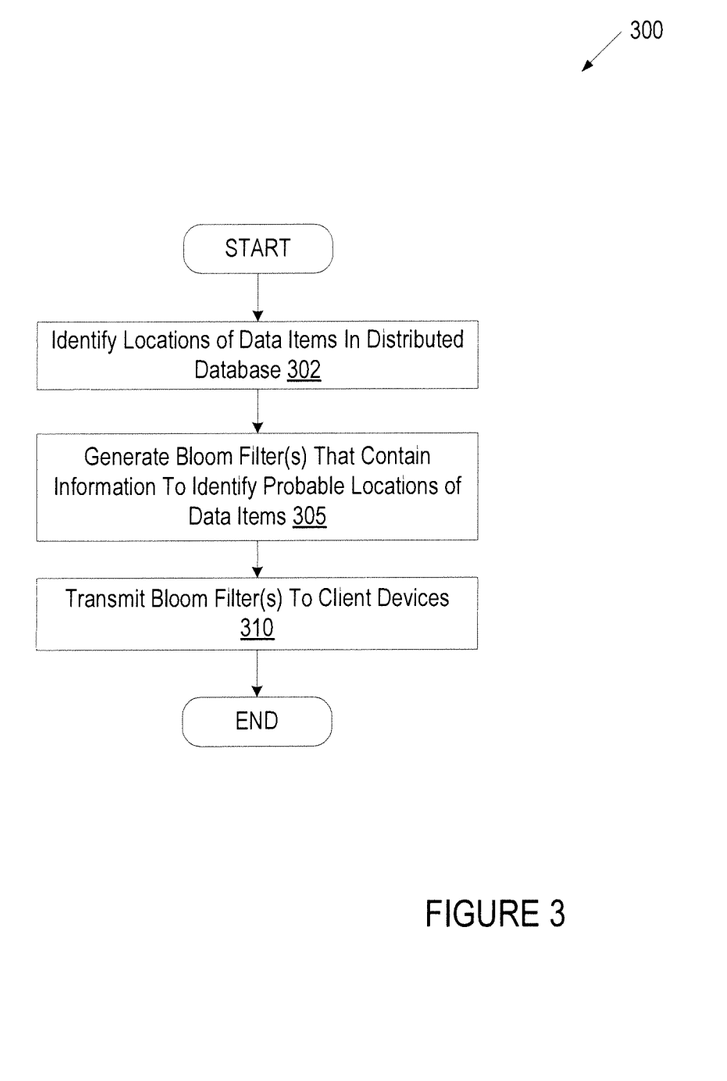
FIG. 3 illustrates a flow diagram of one embodiment for a method of generating data location bloom filters.

FIG. 3 illustrates a flow diagram of one embodiment for a method 300 of generating data location bloom filters. The method 300 may be performed by processing logic that may comprise hardware (e.g., circuitry, dedicated logic, programmable logic, microcode, etc.), software (such as instructions run on a processing device), or a combination thereof. In one embodiment, method 300 is performed by a machine that includes a bloom filter generator (e.g., bloom filter generator 265 of FIG. 2B).

Referring to FIG. 3, at block 302 processing logic identifies locations of data items in a distributed data store. In one embodiment, processing logic maintains an index of data items, entries in the index containing unique identifiers of data items and locations of the data items (e.g., database nodes that store the data items). At block 305, processing logic generates a bloom filter (or multiple bloom filters) that contain information to identify probable locations of data items in the distributed database. In one embodiment, each bloom filter is generated based on the data items contained in a particular database node. Accordingly, a bloom filter for a database node may be checked for a particular data item to determine whether that data item is stored in that database node. At block 310, processing logic transmits the bloom filter (or bloom filters) to one or more client devices. The method then ends.

Figure 4:
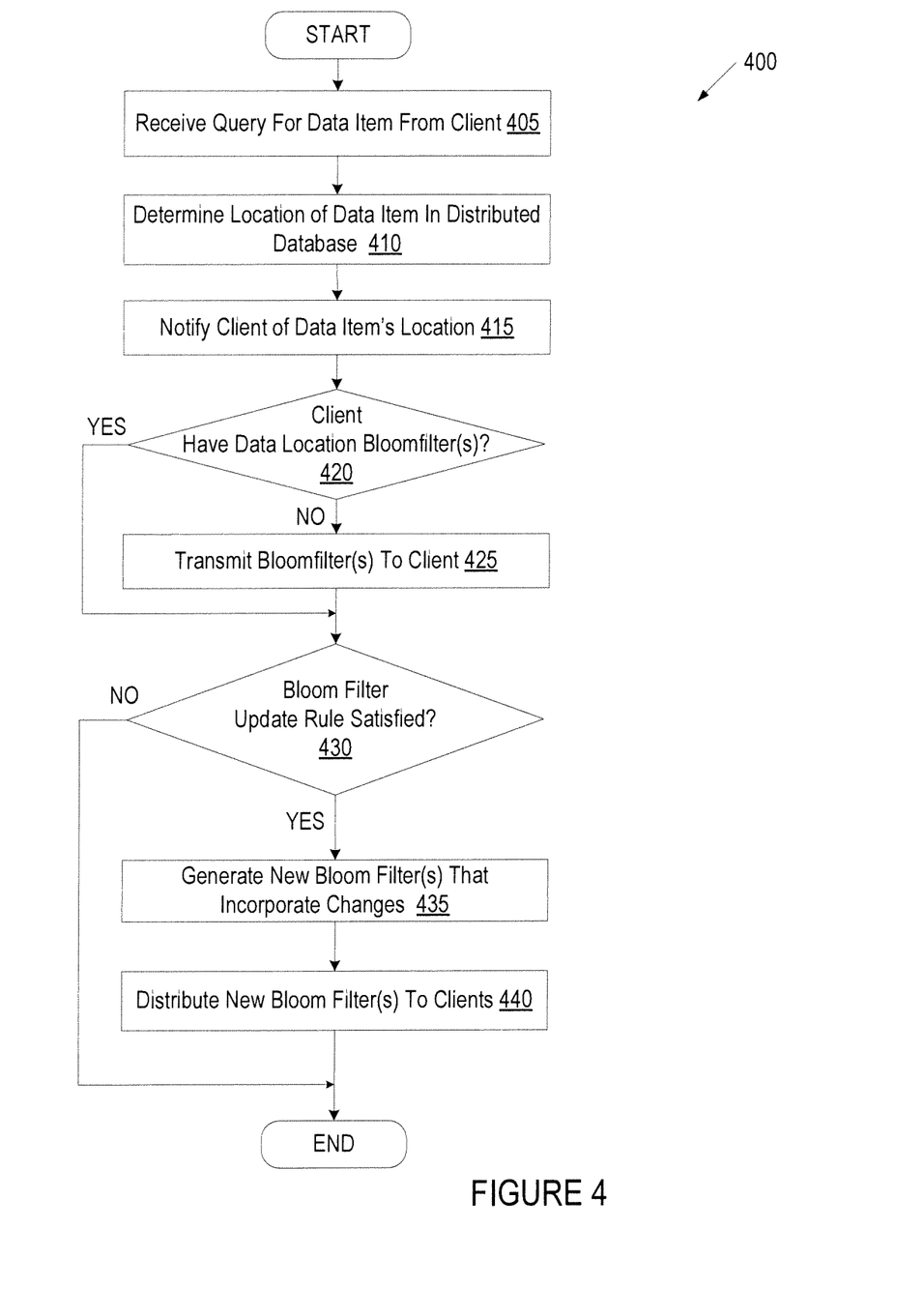
FIG. 4 illustrates a flow diagram of one embodiment for a method of responding to a query for a data item.

FIG. 4 illustrates a flow diagram of one embodiment for a method 400 of responding to a query for a data item. The method may be performed by processing logic that may comprise hardware (e.g., circuitry, dedicated logic, programmable logic, microcode, etc.), software (such as instructions run on a processing device), or a combination thereof. In one embodiment, method 400 is performed by a machine that includes a name server such as name server 255 of FIG. 2B.

Referring to FIG. 4, at block 405 processing logic receives a query for a data item from a client. At block 410, processing logic determines a location of the data item in a distributed database. At block 415, processing logic notifies the client of the data item's location. Alternatively, or in addition, processing logic may redirect or forward the client to the data item's location.

At block 420, processing logic determines whether the client has a data location bloom filter (or bloom filters) for the distributed database. Processing logic may maintain a record of clients to which data item bloom filters have been sent. If the client is not in the record, processing logic may conclude that the client has not previously received the bloom filters. If the client already has a copy of the bloom filters, the method proceeds to block 430. Otherwise, the method continues to block 425, and processing logic transmits the bloom filters to the client.

At block 430, processing logic determines whether a bloom filter update rule has been satisfied. A bloom filter update rule may be satisfied for a particular bloom filter if the database node associated with that bloom filter has undergone a threshold amount of changes (e.g., added data items, deleted data items, modified data items, moved data items, etc.). If any bloom filter update rule is satisfied, the method continues to block 435. Otherwise, the method ends.

At block 435, processing logic generates a new bloom filter (or multiple new bloom filters) that incorporate changes that have been made to a database node since a last bloom filter was generated. This may include deleting bloom filters for database nodes that have been taken offline. At block 440, processing logic distributes the new bloom filter to clients. Processing logic may also distribute instructions to delete bloom filters associated with database nodes that have been taken offline. The method then ends.

Figure 5:
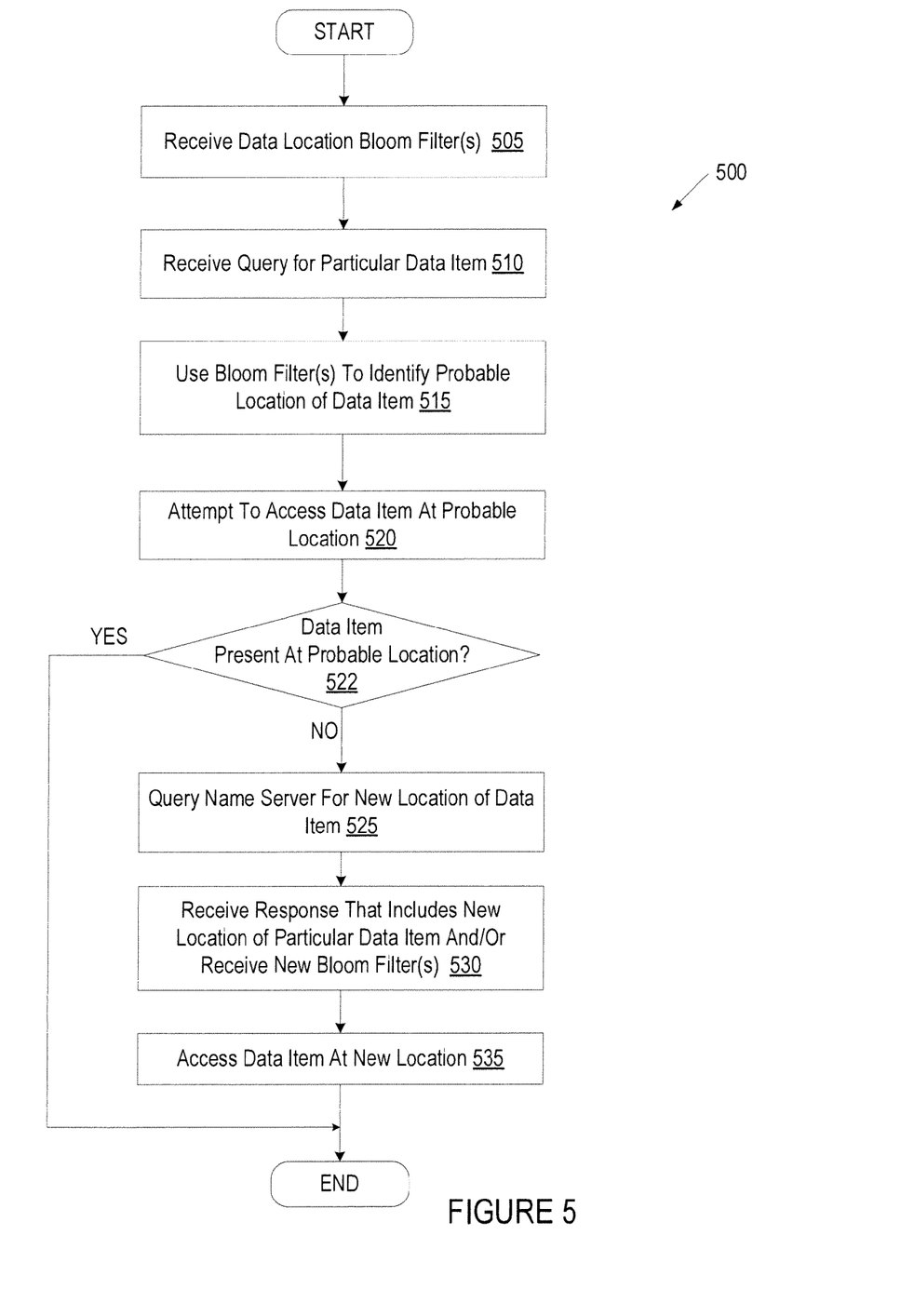
FIG. 5 illustrates a flow diagram of one embodiment for a method of using a data location bloom filter to locate data in a distributed data store.

FIG. 5 illustrates a flow diagram of one embodiment for a method 500 of using a data location bloom filter to locate data in a distributed data store. The method may be performed by processing logic that may comprise hardware (e.g., circuitry, dedicated logic, programmable logic, microcode, etc.), software (such as instructions run on a processing device), or a combination thereof. In one embodiment, method 500 is performed by a machine that includes a database interactor such as database interactor 205 of FIG. 2A.

Referring to FIG. 5, at block 505 processing logic receives a data location bloom filter (or multiple data location bloom filters) for a distributed database. At block 510, processing logic receives a query for a particular data item stored in the distributed database. The query may be received from a user or from an application. At block 515, processing logic uses the bloom filter (or bloom filters) to identify a probable location of the data item. Processing logic may also identify multiple probable locations for the data item (e.g., if the data item is stored at multiple locations in the database).

At block 520, processing logic attempts to access the data item at the probable location (or one of the probable locations). Processing logic may send a database query for the data item directly to the location (e.g., to a database node in the distributed database), bypassing a name server.

At block 522, processing logic determines whether the data item is present at the probable location. If the probable location responds with the data item or information about the data item, then processing logic can confirm that the data item is stored at the location. If the probable location responds with an error message or a redirect to a name server, then processing logic can determine that the data item is not located at the probable location. If the data item was at the probable location, the method ends. Otherwise, the method continues to block 525.

At block 525, processing logic queries a name server of the distributed database for the data item or for a new location of the data item. At block 530, processing logic receives a response from the name server that includes a new location of the data item. Processing logic may also receive a new bloom filter for the new location and/or a new bloom filter for the identified probable location. At block 535, processing logic accesses the data item at the new location. The method then ends.

Figure 6:
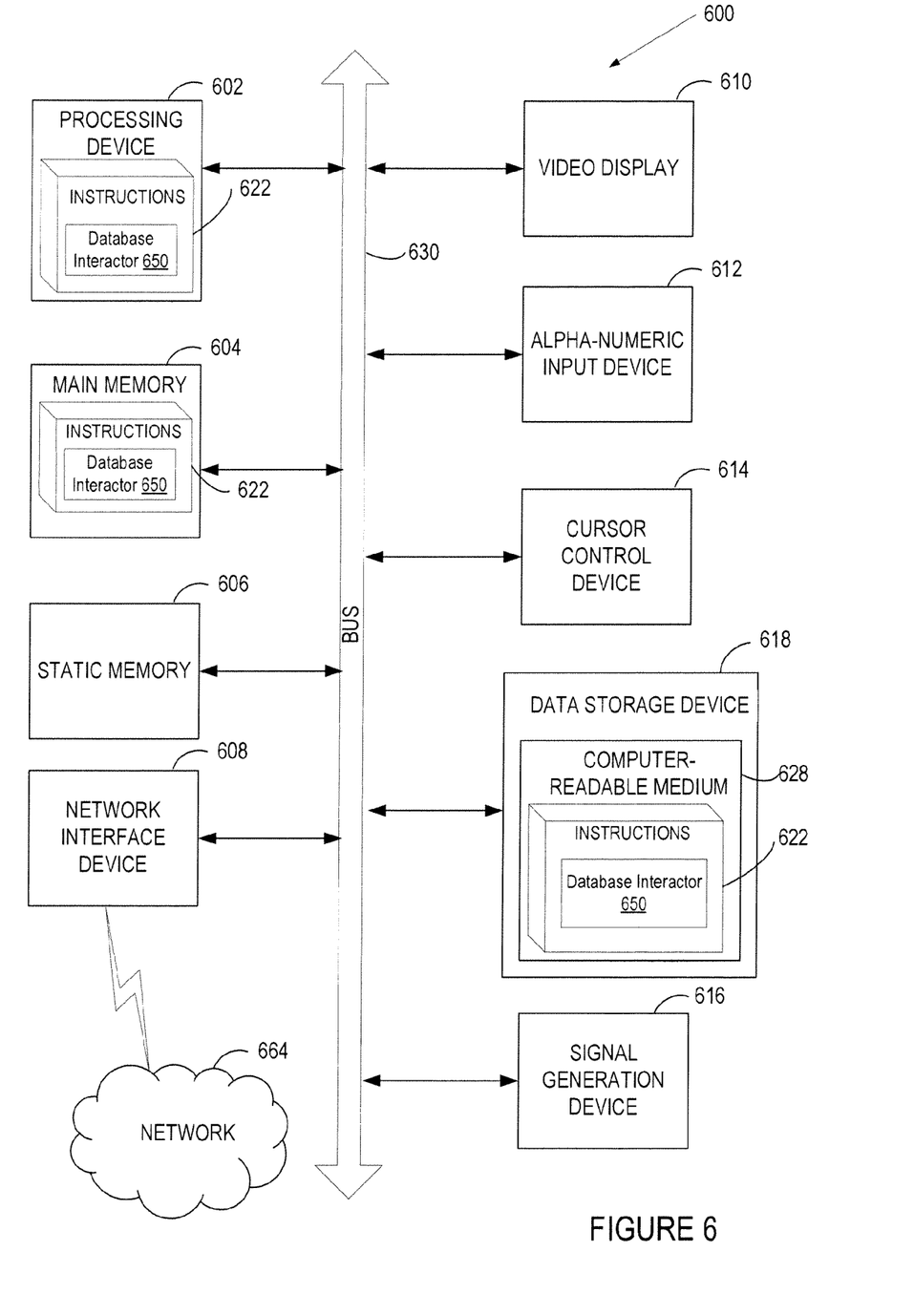
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one embodiment, the instructions 622 include instructions for a database interactor 660 and/or a name server (e.g., database interactor 112 and/or name server 115 of FIG. 1) and/or a software library containing methods that call a database interactor 660 and/or name server. While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "receiving" or "notifying" or "transmitting" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
identifying, by a processing device of server computing device, a first possible location of a data item in a distributed database, wherein the first possible location of the data item is on a second server in the distributed database;
generating, by the processing device, a first probabilistic data structure that comprises information to identify the first possible location of the data item in the distributed database;
providing the first probabilistic data structure to a client computing device before the client computing device sends a request for the data item, wherein the client computing device is not involved with an operation to generate the first probabilistic data structure;
receiving, by the processing device, a query for the data item in response to the client computing device failing to locate the data item in view of the first probabilistic data structure;
determining a second possible location of the data item by querying a name server comprising an index to identify locations of data items stored in the distributed database;
generating a second probabilistic data structure to identify the second possible location of the data item; and
providing the second probabilistic data structure to the client computing device.

2. The method of claim 1, wherein the first probabilistic data structure is to identify whether there is a high probability that the data item is stored at the first possible location within the distributed database.

3. The method of claim 1, further comprising:
notifying the client computing device of the second possible location for the data item.

4. The method of claim 1, further comprising:
determining that a threshold number of changes have been made to the distributed database; and
generating a third probabilistic data structure to incorporate the changes.

5. The method of claim 1, wherein the data item comprises at least one of a database table, a database record, a database column or a database field, and wherein the first probabilistic data structure is usable by one or more client computing devices to determine the first possible location of the data item in the distributed database.

6. A method comprising:
receiving, by a processing device of a client computing device, a probabilistic data structure to probabilistically identify a first possible location of a data item in a distributed database, wherein the client computing device is not involved with an operation to generate the probabilistic data structure;
receiving, by the processing device, a query for the data item;
using, by the processing device, the probabilistic data structure to identify the first possible location of the data item in the distributed database, wherein the first possible location of the data item is on a second server in the distributed database;
attempting to access, in view of the probabilistic data structure, the data item from the first possible location at the second server without querying a name server;
receiving a response, via the second server, that the data item is not present at the second server;
querying the name server for an exact location of the data item, wherein the name server comprises an index to identify locations of data items stored in the distributed database;
receiving a response that comprises the exact location of the data item; and
accessing the data item at the exact location.

7. The method of claim 6, further comprising:
periodically receiving a new probabilistic data structure to probabilistically identify at least one of a new location of an existing data item or a location of a new data item.

8. The method of claim 6, wherein the probabilistic data structure identifies, for the data item, a plurality of possible locations in the distributed database for the data item.

9. The method of claim 6, wherein the data item comprises at least one of a database table, database record, database column or database field.

10. A non-transitory computer readable storage medium having instructions that, when executed by a processing device, cause the processing device to perform operations comprising:
identify, by the processing device, a first possible location of a data item in a distributed database;
generate, by the processing device, a first probabilistic data structure that comprises information to identify the first possible location of the data item in the distributed database, wherein the first possible location of the data item is on a second server in the distributed database;
provide the first probabilistic data structure to a client computing device, wherein the client computing device is not involved with an operation to generate the probabilistic data structure;
receive, by the processing device, a query for the data item in response to the client computing device failing to locate the data item in view of the first probabilistic data structure;
determine a second possible location of the data item by querying a name server comprising an index to identify locations of data items stored in the distributed database;
generate a second probabilistic data structure to identify the second possible location of the data item; and
provide the second probabilistic data structure to the client computing device.

11. The non-transitory computer readable storage medium of claim 10, the operations further comprising:
wherein the first probabilistic data structure is to identify whether there is a high probability that the data item is stored at the first possible location within the distributed database.

12. The non-transitory computer readable storage medium of claim 10, the operations further comprising:
notify the client computing device of the second possible location for the data item.

13. The non-transitory computer readable storage medium of claim 10, the operations further comprising:
determine that a threshold number of changes have been made to the distributed database; and generate a third probabilistic data structure to incorporate the changes.

14. The non-transitory computer readable storage medium of claim 12, wherein the data item comprises at least one of a database table, a database record, a database column or a database field, and wherein the first probabilistic data structure is usable by the client computing device to determine the locations of a plurality of data items in the distributed database.

15. A non-transitory computer readable storage medium having instructions that, when executed by a processing device of a client device, cause the processing device to perform operations comprising:
 receive, by the processing device, a probabilistic data structure to probabilistically identify a plurality of possible locations of a data item in a distributed database, wherein the client computing device is not involved with an operation to generate the probabilistic data structure;
 receive a query for the data item;
 use, by the processing device, the probabilistic data structure to identify a first possible location of the data item in the distributed database, wherein the first possible location of the data item is on a second server in the distributed database;
 access, in view of the probabilistic data structure, the second server for the data item without querying a name server;
 receive a response, via the second server, that the data item is not present at the second server;
 query, by the processing device, the name server for an exact location of the data item, wherein the name server comprises an index to identify locations of data items stored in the distributed database and the exact location is on a third server in the distributed database; and
 accessing the data item at the third server.

16. The non-transitory computer readable storage medium of claim 15, wherein the data item comprises at least one of a database table, database record, database column or database field.

17. A system comprising:
 a server computing device comprising a memory and a processing device coupled to the memory, wherein the processing device is to:
  identify a first possible location of a data item in a distributed database;
  generate a probabilistic data structure that comprises information to identify the first possible location of the data item in the distributed database, wherein the first possible location of the data item is on a second server in the distributed database; and
  provide the probabilistic data structure to a client computing before the client computing device sends a request for the data item, wherein the client computing device is not involved with an operation to generate the probabilistic data structure
  receive a query for the data item in response to the client computing device failing to locate the data item in view of the probabilistic data structure;
  determine an exact location of the data item by querying a name server comprising an index to identify locations of data items stored in the distributed database; and
  provide the exact location of the data item to the client computing device.

18. The system of claim 17, further comprising:
 a client computing device, networked to the server computing device, the client computing device comprising an additional processing device to:
  receive the probabilistic data structure;
  use the probabilistic data structure to identify the first possible location of the data item in the distributed database; and
  access, in view of the probabilistic data structure, the data item from the first possible location without querying the server computing device.

* * * * *